Nov. 3, 1970     A. J. FISTER     3,538,479

PROTECTOR FOR ELECTRIC CIRCUITS

Filed June 11, 1968

# United States Patent Office 3,538,479
Patented Nov. 3, 1970

3,538,479
PROTECTOR FOR ELECTRIC CIRCUITS
Aloysius J. Fister, St. Louis, Mo., assignor to McGraw-Edison Company, Elgin, Ill., a corporation of Delaware
Filed June 11, 1968, Ser. No. 736,117
Int. Cl. H01h 85/12, 85/14
U.S. Cl. 337—166                                27 Claims

ABSTRACT OF THE DISCLOSURE

Elongated, relatively-massive, heat-resistant, electrically-insulating, heat-conducting blocks are disposed in heat-transferring engagement with major portions of the lengths of surfaces of the fusible element of an electric fuse that is used to protect an electric circuit, to which two hundred or more volts are applied; and those blocks are long enough and are so located that they directly engage all of the "weak spots" of that fusible element plus the greater-width portions of that fusible element which are contiguous to those "weak spots." Those elongated, relatively-massive, heat-resistant, electrically-insulating, heat-conducting blocks materially increase the current-carrying capacity of that electric fuse while enabling that electric fuse to continue to have substantially the same current-limiting capability.

This invention relates to improvements in protectors for electric circuits. More particularly, this inveniton relates to improvements in electric fuses.

It is therefore, an object of the present invention to provide an improved electric fuse.

When a heavy overload or a "short" develops in an electric circuit to which two hundred or more volts are applied, the electric fuse which is used to protect that electric circuit will open that electric circuit and thereby keep further current from flowing through the electric components of that electric circuit. While that electric fuse will respond to a "short" to open that electric circuit within a small fraction of a second, the finite amount of time which elapses between the instant a "short" develops in that electric circuit and the instant that electric fuse opens that electric circuit will permit the current flowing through that electric circuit to increase. That current— which is referred to as the instantaneous peak let-through current—must be kept as low as possible, to keep that current from injuring the electric components of the electric circuits; and, consequently, electric fuses have been developed which have had relatively low instantaneous peak let-through currents. Experience indicates that as the current-carrying capacity of an electric fuse is increased, the instantaneous peak let-through current of that electric fuse also increases; and hence an increase in the current-carrying capacity of an electric fuse has meant a decrease in the current-limiting capacity of that electric fuse. It would be desirable to provide an electric fuse for electric circuits to which two hundred or more volts are applied, which had an increased current-carrying capacity but which did not have a reduced current-limiting capability; because such an electric fuse could safely carry and interrupt larger currents. The present invention provides such an electric fuse; and it is, therefore, an object of the present invention to provide an electric fuse for electric circuits to which two hundred or more volts are applied, which has an increased current-carrying capacity but which does not have a reduced current-limiting capability.

The electric fuse provided by the present invention has a fusible element with one or more reduced-width portions which serve as "weak spots," and has elongated, relatively-massive, heat-resistant, electrically-insulating, heat-conducting blocks disposed in heat-transferring engagement with major portions of the lengths of surfaces of that fusible element; and those blocks are long enough and are so located that they directly engage all of those "weak spots" plus the greater-width portions of that fusible element which are contiguous to those "weak spots." Those elongated, relatively-massive, heat-resistant, electrically-insulating, heat-conducting blocks materially increase the current-carrying capacity of the electric fuse while enabling that electric fuse to continue to have substantially the same current-limiting capability. Specifically, as long as the current flowing through the electric fuse does not exceed the rated current of that electric fuse, the elongated, relatively-massive, heat-resistant, electrically-insulating, heat-conducting blocks will directly absorb substantial amounts of heat from the "weakspots" of the fusible element and from the greater-width portions of that fusible element which are contiguous to those "weak spots"; and those elongated, relatively-massive, heat-resistant, electrically-insulating, heat-conducting blocks will transfer part of that heat to the arc-extinguishing material within the housing of that electric fuse, will radiate another part of the heat into the air spaces within that arc extinguishing material, will transfer yet another part of that heat to cooler portions of that fusible element, will conduct a further part of that heat toward the terminals of that electric fuse, and will dissipate a still further part of that heat. The resulting direct and immediate removal of substantial amounts of heat from the "weak spots" of the fusible element will enable the electric fuse to carry more current—and thus have a higher current-carrying capacity—than could an electric fuse which had the same fusible element but which did not have elongated, relatively-massive, heat-resistant, electrically-insulating, heat-conducting blocks in heat-transferring engagement with major portions of the lengths of surfaces of that fusible element and directly engaging the "weak spots" and the contiguous greater-width portions of that fusible element. However, those elongated, relatively-massive, heat-resistant, electrically-insulating, heat-conducting blocks will not, when a "short" develops in the electric circuit, have sufficient time to absorb any appreciable amounts of heat from the "weak spots" of the fusible element of the electric fuse; and hence that electric fuse will be able to open the electric circuit as rapidly as—and thus have a current-limiting capability as high as—an electric fuse which had the same fusible element but which did not have elongated, relatively-massive, heat-resistant, electrically-insulating, heat-conducting blocks in heat-transferring engagement with major portions of the lenghs of surfaces of that fusible element and directly engaging the "weak spots" and the contiguous greater-width portions of that fusible element. It is, therefore, an object of the present invention to provide an electric fuse, for electric circuit to which two hundred or more volts are applied, which has elongated, relatively-massive, heat-resistant, electrically-insulating, heat-conducting blocks disposed in heat-transferring engagement with major portions of the lengths of surfaces of the fusible element of that electric fuse and directly engaging the "weak spots" and the contiguous greater width portions of that fusible element.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Figures 1, 2, 3, 4, 5:
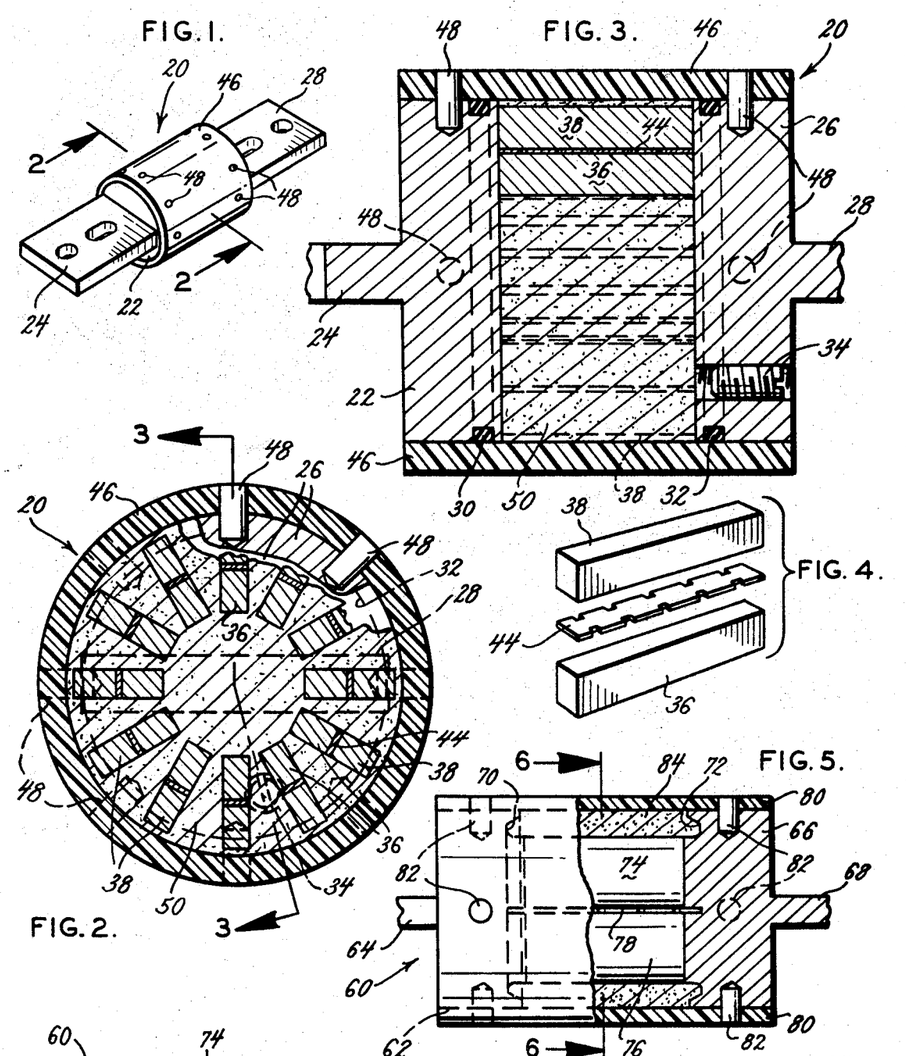
FIG. 1 is a perspective view of one preferred embodiment of electric fuse that is made in accordance with the principles and teaching of the present invention.
FIG. 2 is a larger scale, partially broken-away, sectional view through the electric fuse of FIG. 1, and it is taken along the plane indicated by the line 2—2 in FIG. 1.
FIG. 3 is a sectional view, on the scale of FIG. 2, through the electric fuse of FIG. 1, and it is taken along the broken plane indicated by the broken line 3—3 in FIG. 2.
FIG. 4 is a perspective, exploded view of one of the fusible elements and two of the elongated, relatively-massive, heat-resistant, electrically-insulating, heat-conducting blocks used in the electric fuse of FIG. 1.
FIG. 5 is a partially broken-away, partially-sectioned, side view of a second preferred embodiment of electric fuse that is made in accordance with the principles and teachings of the present invention.

Referring to the drawing in detail, the numeral 20 generally denotes one preferred embodiment of electric fuse that is made in accordance with the principle and teachings of the present invention, and that can be used to protect electric circuits to which two hundred or more volts are applied. That electric fuse has a metal end bell 22 which is generally-cylindrical in configuration and which has a generally-flat attaching portion 24 projecting outwardly from the outer face thereof. That electric fuse has a second metal end bell 26 which is generally-cylindrical in configuration and which has a generally-flat attaching portion 28 projecting outwardly from the outer face thereof. Annular grooves are formed in the peripheries of the generally-cylindrical portions of the end bells 22 and 26; and the annular groove in the generally-cylindrical portion of the end bell 22 accommodates an O-ring 30, while the annular groove in the generally-cylindrical portion of the end bell 26 accommodates an O-ring 32. The normal thicknesses of those O-rings are greater than the depths of the annular grooves in the generally-cylindrical portions of the end bells 22 and 26; but those O-rings are made from yieldable material. As a result, those O-rings can be compressed so substantially all portions thereof will fit within those annular grooves, as shown by FIG. 3. A threaded plug 34 is releasably mounted within a threaded opening in the end bell 26.

The numeral 36 denotes an elongated, relatively-massive, heat-resistant, electrically-insulating, heat-conducting block; and that block is a prism which has a rectangular cross-section. That block can be made from aluminum oxide, beryllium oxide, boron nitride, or any other heat-resistant, electrically-insulating compound which has a thermal conductivity greater than thirty thousandths of a calorie per square centimeter of cross section per centimeter of length per second of time per degree centigrade. The block 36 could not be made from fibre, glass melamine, or any other insulating material which was organic in nature; because an organic insulating material is not heat-resistant. Specifically, an organic insulating material would char, and might burn, at the temperatures at which the fusible elements of electric fuses open electric circuits; and any such charring and burning would be unacceptable. The block 36 could not be made from glass silicone, porcelain, steatite, or the like, because those materials are heat-insulating rather than heat-conducting. If desired, the block 36 could be made with a metal core—either by machining a recess in a block of aluminum oxide, beryllium oxide, boron nitride or the like and then disposing a metal core in that recess, or by forming one or more layers of aluminum oxide, beryllium oxide, boron nitride or the like on the surfaces of a metal core. However, the block 36 could not be made by anodizing a metal core, by forming an insulating coating on a metal core by an iriditing process, by the Parkerizing process, by an enameling process, or by a porcelainizing process, or by spraying molten zirconium oxide or the like onto the surfaces of a metal core; because the resulting coatings would break down under the intense and prolonged heating that would occur when the electric fuse 20 opened an electric circuit to which two hundred or more volts were applied. Also, if desired, the block 36 could have a block of metal set in engagement with the outer face thereof to effectively increase the thermal capacity of that block. The ends of the block 36 are metallized; and that block is long enough so the ends thereof abut the confronting faces of the end bells 22 and 26. The metallized ends of the block 36 can be readily soldered to the confronting faces of those end bells; and, when those ends have been so soldered, the solder will mechanically connect and thermally-bond that block to those end bells. The numeral 38 denotes a block which can be identical to the block 36; and the metallized ends of the block 38 are soldered to the confronting faces of the end bells 22 and 26.

The numeral 44 denotes a fusible element which is made from silver, copper or other metal; and that fusible element is dimensioned so the opposite ends thereof abut, and can be soldered to, the confronting faces of the end bells 22 and 26. The fusible element 44 is rectangular in cross section, as shown by FIG. 2; and it has a number of reduced-width portions along the length thereof, as shown by FIG. 4. Those reduced-width portions act as "weak spots"; and they will be able to respond to a heavy overload or "short" to fuse with minimal generation of vapors and pressure. As shown by FIG. 2, the widths of the greater-width portions of the fusible element 44 are equal to the width of block 36, and thus are equal to the width of block 38.

The block 36 is in intimate engagement with the lower wide surface of the fusible element 44, and the block 38 is in intimate engagement with the upper wide surface of that fusible element. Those blocks will be held in intimate engagement with those wide surfaces by a string or wire wrapping, or by a jig or fixture, until the ends of those blocks and the ends of that fusible element have been soldered to the confronting faces of the end bells 22 and 26. After those ends have been soldered to those confronting faces, the wrapping or the jig or fixture can be removed. This means that the left-hand ends of the blocks 36 and 38 and of the fusible element 44 in FIG. 3 will all be soldered to the inner face of the end bell 22, and that the right-hand ends of those blocks and of that fusible element will all be soldered to the inner face of the end bell 26. Because those blocks are heat-conducting and are in intimate engagement with major portions of surfaces of that fusible element, those blocks will absorb substantial amounts of heat from that fusible element. However, because the blocks 36 and 38 are electrically-insulating, those blocks will not act as shunts for the fusible element 44.

As indicated particularly by FIG. 2, the electric fuse 20 has eleven additional blocks that are identical to the block 36, has eleven additional blocks that are identical to the block 38, and has eleven additional fusible elements that are identical to the fusible element 44. Each of those additional blocks has the ends thereof soldered to the end bells 22 and 26, and each of those additional elements has the ends thereof soldered to those end bells. Furthermore, each of those additional fusible elements has a bolck, identical to the block 36, in heat-transferring engagement with the inner surface thereof, and has a block, identical to the block 38, in heat-transferring engagement with the outer surface thereof. As a result, the electric fuse 20 has twelve fusible elements which are connected in parallel to electrically-interconnect the end bells 22 and 26; and each of those fusible elements has two elongated relatively-massive, heat resistant, electrically-insulating, heat-conducting blocks in heat-transferring engagement with the wide surfaces thereof.

The numeral 46 denotes a tubular casing of insulating material which telescopes over the generally-cylindrically portions of the end bells 22 and 26; and that casing coacts with those end bells to enclose and confine the fusible element 44 and the eleven additional fusible elements as well as the blocks 36 and 38 and the twenty-two additional blocks. The O-rings 30 and 32 will be disposed within the annular grooves in the generally-cylindrical portions of the end bells 22 and 26 before the casing 46 is telescoped over those generally-cylindrical portions; and those O-rings will be compressed as that casing is telescoped over those generally-cylindrical portions. Radially-directed openings in the ends of that tubular casing are aligned with radially- directed sockets in the generally-cylindrical portions of the end bells 22 and 26; and pins 48 pass through those radially-directed openings and seat within those radially-directed sockets to hold that casing in assembled relation with those end bells. The casing 46 and the end bells 22 and 26 coact to define a space, and that space is filled with arc-extinguishing material 50, such as sand. That arc-extinguishing material will be introduced into that space through the internally-threaded passage in end bell 26 which is normally closed by the threaded plug 34.

The generally-flat attaching portions 24 and 28, respectively, of the end bells 22 and 26 will be used to connect the electric fuse 20 into an electric circuit. As long as the current flowing through the electric fuse 20 does not exceed the rated current of that electric fuse, the fusible element 44 and the eleven additional fusible elements will remain intact. Those fusible elements will generate heat as current flows through them, but the ends of those fusible elements will transfer part of that heat to the end bells 22 and 26; and the blocks 36 and 38 and the twenty-two additional blocks will absorb a further part of that heat—transferring part of that heat to the arc-extinguishing material 50 within the casing 46, radiating another part of that heat into the air spaces within that arc-extinguishing material, transferring yet another part of that heat to cooler portions of those fusible elements, conducting a further part of that heat toward the end bells 22 and 26, and dissipating a still further part of that heat. The resulting direct and immediate removal of substantial amounts of heat from the fusible element 44 and from the eleven additional fusible elements of the electric fuse 20 will enable those fusible elements to be very much cooler than would the fusible elements of an electric fuse which was carrying the same amount of current as, and which was indentical to, the electric fuse 20—except for the absence of any blocks like the blocks 36 and 38. Because the blocks 36 and 38 and the additional twenty-two blocks absorb such substantial amounts of heat from the fusible element 44 and the eleven additional fusible elements, the electric fuse 20 will usually have a current-carrying capacity at least twenty-five percent higher than the current carrying-capacity of another electric fuse which is identical to the electric fuse 20 except for the absence of any blocks like the blocks 36 and 38.

Whenever an overload causes the current flowing through the electric fuse 20 to exceed the rated current of that electric fuse, the fusible element 44 and the eleven additional fusible elements will generate more heat than they will generate while the current flowing through that electric fuse is at or below the rated current of that electric fuse. If the overload is not a heavy overload and if it is not unduly prolonged, the elongated, relatively-massive, heat-resistant, electrically-insulating, heat-conducting blocks 36 and 38 and the other twenty-two blocks will be able to absorb enough heat from the fusible element 44 and from the eleven additional fusible elements to keep all of those fusible elements from fusing. As a result, the electric fuse 20 will remain intact and will not open the circuit of which it is a part; and this is desirable because it will keep moderate overloads, which are not prolonged long enough to be harmful, from opening the circuit. If the overload is a heavy overload but is transitory in character, the elongated, relatively-massive, heat-resistant, electrically-insulating, heat-conducting blocks 36 and 38 and the other twenty-two blocks will be able to absorb enough heat from the fusible element 44 and from the eleven additional fusible elements to keep all of those fusible elements from fusing. Consequently, the electric fuse 20 will remain intact and will not open the circuit of which it is a part; and this is desirable because it will keep current surges that are transitory in character from opening the circuit. If the overload is a heavy overload and is not transitory in character, the elongated, relatively-massive, heat-resistant ,electrically-insulating, heat-conducting blocks 36 and 38 and the other twenty-two blocks will not be able to absorb enough heat from the fusible element 44 and from the eleven additional fusible elements to keep all of these fusible elements from fusing. As a result, the fusible element 44 and the eleven additional fusible elements will fuse and open the circuit; and this is desirable because it will keep such overloads from injuring the circuit. If a "short" occurs, the fusible element 44 and the eleven additional fusible elements will fuse and open the circuit so quickly that the elongated, relatively-massive, heat-resistant, electrically-insulating, heat-conducting blocks 36 and 38 and the other twenty-two blocks will be unable to absorb any appreciable amounts of heat from those fusible elements; and this is desirable because it will keep "shorts" from injuring the circuit. The overall result is that the electric fuse 20 will prevent needless "blows", but will open the circuit before any overload or "short" could injure the circuit.

It is important to note that although the electric fuse 20 can have a current-carrying capacity at least twenty-five percent higher than the current-carrying capacity of another electric fuse which is identical to it except for the absence of any blocks like the blocks 36 and 38, the instantaneous peak let-through current of the electric fuse 20 can be as small as the instantaneous peak let-through current of that other electric fuse. For example, an electric fuse which did not have any elongated, relatively-massive, heat-resistant, electrically-insulating, heat-conducting blocks and which had a current-carrying capacity of two hundred amperes and an instantaneous peak let-through current of about nineteen thousand amperes when tested with an available short-circuit current of one hundred thousand amperes could have a current-carrying capacity of two hundred and fifty amperes and still have the same instantaneous peak let-through current if it was equipped with such blocks. If that electric fuse were to be made so it had a current-carrying capacity of two hundred and fifty amperes but did not have any elongated, relatively-massive, heat-resistant, electrically-insulating, heat-conducting blocks, the instantaneous peak let-through current of that electric fuse would increase to about twenty-three and one-half thousand amperes. The lower instantaneous peak let-through current, and thus the higher current-limiting capability of the electric fuse 20, over an electric fuse that is identical to it except that it does not have elongated, relatively-massive, heat-resistant, electrically-insulating, heat-conducting blocks, is very important, because it could mean the difference between full protection for an electric circuit and less than full protection for that electric circuit.

Figure 6:
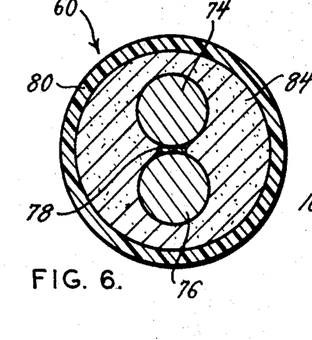
FIG. 6 is a sectional view through the fuse of FIG. 5, and it is taken along the plane indicated by the line 6—6 in FIG. 5.

Referring to FIGS. 5 and 6, the numeral 60 generally denotes a second preferred embodiment of electric fuse that is made in accordance with the principles and teachings of the present invention, and that can be used to protect electric circuits to which two hundred or more volts are applied. That fuse has a metal end bell 62 which is generally-cylindrical in configuration and which has a generally-flat attaching portion 64 projecting outwardly from the outer face thereof. That electric fuse also has a metal end bell 66 which is generally-cylindrical in configuration and which has a generally-flat attaching portion 68 projecting outwardly from the outer face thereof. The inner face of the end bell 62 has an annular groove 70 therein, and the inner face of the end bell 66 has a corresponding annular groove 72 therein.

The numeral 74 denotes an elongated, relatively-massive, heat-resistant, electrically-insulating, heat-conducting block; and that block has the form of a right circular cylinder. Both ends of that block are metallized, and that block is long enough so those ends abut the confronting faces of the end bells 62 and 66. The numeral 76 denotes a block which can be identical to the block 74. The numeral 78 denotes a fusible element which has a length comparable to those of the blocks 74 and 76; and the ends of those blocks and of that fusible element are soldered to the confronting faces of the end bells 62 and 66. A tubular casing 80 of insulating material telescopes over the end bells 62 and 66, over the blocks 74 and 76, and over the fusible element 78. Pins 82 fixedly secure that casing to those end bells; and the interior of the electric fuse 60 is filled with arc-extinguishing material 84.

The upper and lower surfaces of the fusible element 78 are intimately engaged by the confronting faces of the blocks 74 and 76; and those blocks will absorb heat from that fusible element and will transfer part of that heat to the arc-extinguishing material 84, will radiate another part of that heat into the air spaces within that arc-extinguishing material, will transfer yet another part of that heat to cooler portions of that fusible element, will conduct a further part of that heat toward the end bells 62 and 66, and will dissipate a still further part of that heat. The resulting direct and immediate removal of substantial amounts of heat from the "weak spots" of the fusible element 78 will enable the electric fuse 60 to carry more current—and thus have a higher current-carrying capacity—than could an electric fuse which had the same fusible element but which did not have elongated, relatively-massive, heat-resistant, electrically-insulating, heat-conducting blocks in heat-transferring engagement with the length of that fusible element. Because the blocks 74 and 76 essentially have only line contact with the upper and lower surfaces of the fusible element 78, those blocks will not be able to absorb as much heat from that fusible element as the blocks 36 and 38 absorb from the fusible element 44 in the electric fuse 20. However, the blocks 74 and 76 will absorb sufficient heat from the fusible element 78 to enable the electric fuse 60 to have a rating which is appreciably greater than the rating of an electric fuse which was identical to the electric fuse 60 except for the absence of the blocks 74 and 76.

Figure 7:
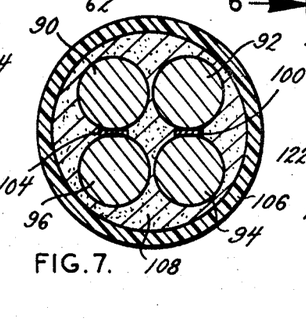
FIG. 7 is a sectional view through an electric fuse which is generally similar to the electric fuse of FIGS. 5 and 6 but which has two fusible elements rather than just one fusible element.

Referring particularly to FIG. 7, the numerals 90, 92, 94 and 96 denote elongated, relatively-massive, heat-resistant, electrically-insulating, heat-conductig blocks which have the form of right circular cylinders, and which can be identical to the blocks 74 and 76 in FIG. 6. The numerals 100 and 104 denote fusible elements which can be identical to the fusible element 78 in FIG. 6. The blocks 90, 92, 94 and 96 will have the ends thereof metallized and soldered to the end bells of the fuse in FIG. 7; and the fusible elements 100 and 104 also will have the ends thereof soldered to those end bells. A tubular casing 106 of insulating material will telescope over those end bells, over those blocks, and over those fusible elements; and arc-extinguishing material 108 will fill the interior of the electric fuse of FIG. 7.

As shown in FIG. 7, the blocks 90, 92, 94 and 96 and the fusible elements 100 and 104 are arranged so each of those fusible elements has two of those blocks abutting the wide surfaces thereof. As a result, each of those fusible elements will have substantial portions of the heat generated therein absorbed from it. As in the case of the electric fuse 60 of FIGS. 5 and 6, the presence of the elongated, relatively-massive, heat-resistant, electrically-insulating, heat-conducting blocks enables the fuse of FIG. 7 to have a rating appreciably higher than the rating of a fuse which was identical to the fuse of FIG. 7 but which did not have those blocks.

Figure 8:
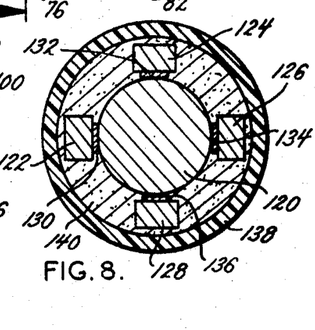
FIG. 8 is a sectional view through still another electric fuse which is generally similar to the electric fuse of FIGS. 5 and 6 but which has a large central block, four circumferentially-spaced blocks, and four fusible elements.

Referring particularly to FIG. 8, the numeral 120 denotes an elongated, relatively-massive, heat-resistant, electrically-insulating, heat-conducting block at the center of a tubular casing 138 of insulating material; and that block has the form of a right circular cylinder. Blocks 122, 124, 126 and 128 are coaxial with that block but are spaced circumferentially of that block. Fusible elements 130, 132, 134 and 136 extend axially of the block 120; and the inner surfaces of those fusible elements engage the block 120, while the outer surfaces of those fusible elements are engaged by the blocks 122, 124, 126 and 128. Arc-extinguishing material 140 fills the interior of the electric fuse of FIG. 8.

Because the blocks 122, 124, 126 and 128 are rectangular in cross section, they will provide surface contact rather than line contact with the outer surfaces of the fusible elements 130, 132, 134 and 136. Consequently, the blocks 122, 124, 126 and 128 will coact with the block 120 to enable the electric fuse of FIG. 8 to have a rating which is appreciably greater than the rating of a similar fuse which was not equipped with those blocks.

In a modified embodiment of the electric fuse shown in FIGS. 5 and 6, the fusible element 78 was made of silver, was seventy-eight ten-thousandths of an inch thick, was two hundred and eighteen thousandths of an inch wide, was one and three-quarters inches long, and had five portions of thirty thousandths of an inch width to serve as "weak spots." The blocks 74 and 76 were made of aluminum oxide, were rectangular in cross-section, were one-quarter of an inch wide, were three-eighths of an inch high, were one and three quarters inches in length, and had the narrow surfaces thereof set in heat-transferring engagement with the upper and lower surfaces of the fusible element 78. That embodiment of electric fuse was connected in series relation with a fuse which was identical to it except for the absence of any elongated, relatively-massive, heat-resistant, electrically-insulating, heat-conducting blocks; and progressively higher values of current were caused to flow through those series-connected electric fuses. Each value of current was applied to the series-connected electric fuses for a sufficiently long period of time to simulate the condition which can exist as more and more current-consuming devices are gradually connected into an electric circuit. Thermometers were attached to the end bells and to the tubular casing of each of the two series-connected electric fuses, readings were made of the ambient temperature, readings were made of the current flowing through those series-connected fuses, and the current was increased by five amperes every thirty minutes.

With an ambient temperature of twenty-two degrees centigrade, and with a current of one hundred amperes flowing through the series-connected fuses, the temperatures at the end bells of the modified embodiment of fuse shown in FIGS. 5 and 6, referred to hereinafter as fuse A, were forty-one and forty-three degrees centigrade and the temperature at the tubular casing was fiifty-six degrees centigrade; whereas the temperatures at the end bells of the electric fuse which did not have the elongated, relatively-massive, heat-resistant, electrically - insulating, heat-conducting blocks, referred to hereinafter as fuse B, were sixty-one and sixty-six degrees centigrade and the temperature at the tubular casing was ninety-nine degrees centigrade. With the ambient temperature at twenty-two degrees centigrade, and with a current of one hundred and five amperes flowing through the series-connected fuses A and B, the temperatures of the end bells of fuse A were forty-six and forty-seven degrees centigrade and the temperature at the utbular casing was sixty-four degrees centigrade; whereas the temperatures of the end bells of fuse B were seventy and seventy-one degrees centigrade and the temperatures at the tubular casing was one hundred and twenty-six degrees centigrade. With an ambient temperature of twenty-three degrees centigrade, and with a current of one hundred and ten amperes flowing through the series-connected fuses A and B, the temperatures at the end bells of fuse A were forty-eight and fifty degrees centigrade and the temperature at the tubular casing was sixty-nine degrees centigrade; whereas the temperatures at the end bells of fuse B were seventy-five and seventy-seven degrees and the temperature at the tubular casing was one hundred and thirty-five degrees centigrade. With an ambient temperature of twenty-three degrees centigrade, and with a current of one hundred and fifteen amperes flowing through the series-connected fuses A and B, the temperatures at the end bells of fuse A were fifty-two and fiifty-three degrees centigrade and the temperature at the tubular casing was seventy-three degrees centigrade; whereas the temperatures at the end bells of fuse B were seventy-six and seventy-seven degrees centigrade and the temperature at the tubular casing was one hundred and thirty-five degrees centigrade. Before the end of the thirty minute period when the current was to be raised to one hundred and twenty amperes, the fusible element of fuse B fused and opened the circuit.

Thereafter, a conductor was substituted for fuse B, and the current flowing through that conductor and fuse A was raised. With an ambient temperature of twenty-three degrees centigrade, and with a current of one hundred and twenty amperes flowing through the series-connected conductor and fuse A, the temperatures at the terminals of that fuse were fifty-nine degrees centigrade, and the temperature at the tubular casing was eighty-seven degrees centigrade. With an ambient temperature of twenty-three degrees centigrade, and with a current of one hundred and twenty-five amperes flowing through the series-connected conductor and fuse A, the temperatures at the end bells of that fuse were sixty-three degrees centigrade, and the temperature at the tubular casing was eighty-nine degrees centigrade. With an ambient temperature of twenty-three degrees centigrade, and with a current of one hundred and thirty amperes flowing through the series-connected conductor and fuse A, the temperatures at the end bells of that fuse were sixty-seven degrees centigrade, and the temperature at the tubular casing was one hundred degrees centigrade. With an ambient temperature of twenty-four degrees centigrade, and with a current of one hundred and thirty-five amperes flowing through the series-connected conductor and fuse A, the temperatures of the end bells of that fuse were seventy-three degrees centigrade, and the temperature at the tubular casing was one hundred and eleven degrees centigrade. With an ambient temperature of twenty-four degrees centigrade and with a current of one hundred and forty amperes flowing through the series-connected conductor and fuse A, the temperatures at the end bells of that fuse were eighty degrees centigrade, and the temperature at the tubular casing was one hundred and twenty-five degrees centigrade. With an ambient temperature of twenty-six degrees centigrade, and with a current of one hundred and forty-five ampres flowing through the series-connected conductor and fuse A, the temperatures of the end bells of that fuse were ninety-six degrees and one hundred and three degrees centigrade, and the temperature at the tubular casing was one houndred and sixty-one degrees centigrade; and the fusible elements 78 of that fuse opened the circuit in less than thirty minutes after the current was raised to one hundred and forty-five amperes. The foregoing comparison shows that the equipping of the fusible element of a fuse with elongated, relatively-massive, heat-resistant, electrically-insulating, heat-conducting blocks can increase the current-carrying capacity of that fuse by more than twenty-five percent. Current-interrupting tests which were made on fuses A and B showed that the use of the elongated, relatively-massive, heat-resistant, electrically-insulating heat-conducting blocks did not perceptibly increase the instantaneous peak let-through current of fuse A; and hence fuse A had substantially the same current-limiting capability as fuse B.

The elongated, relatively-massive, heat-resistant, electrically-insulating, heat-conducting blocks provided by the present invention can, in some instances, conduct heat from one end bell to the other; and such conduction could be very important where the electric fuse was used to protect, and was connected close to, a device which has to have the temperature thereof kept below a predetermined level. For example, such heat conduction would be very important where an electric fuse was used to protect, and was connected close to, a diode or other solid state device which was being operated close to its breakdown temperature. While it is customary to mount diodes and other solid state devices, which are to be operated close to their breakdown temperatures, in heat sinks, and while those heat sinks will absorb substantial amounts of heat from those diodes and other solid state devices, the portions of those diodes and other solid state devices which project outwardly beyond the heat sinks can attain temperatures considerably above the temperatures of those heat sinks. In some cases, those temperatures have attained values which led to breakdowns of the diodes or other solid state devices. By using a short conductor of large cross section to connect one of the electric fuses provided by the present invention to the hottest terminal of a diode or other solid state device, it is possible to transfer substantial amounts of heat to that end bell of that electric fuse which is closest to that diode or other solid state device; and the elongated, relatively-massive, heat-resistant, electrically-insulating, heat-conducting blocks within that electric fuse will then transfer the bulk of those amounts of heat to the other end bell of that electric fuse so it can be conducted away by the bus bar or other heavy conductor to which that other end bell will be connected. When used in such fashion, the electric fuse provided by the present invention will perform the dual functions of protecting the diode or other solid state device from injury due to thermal overloads as well from injury due to electrical overloads. The heat-conducting action of the elongated, relatively-massive, heat-resistant, electrically-insulating, heat-conducting blocks of the electric fuse provided by the present invention also is important where those fuses are used in series with, and also are intended to protect, circuit breakers. Specifically, where an electric fuse provided by the present invention is connected in series with, and close to, a circuit breaker, that electric fuse will enable that circuit breaker to operate at lower temperatures than those at which it would operate if an ordinary fuse was connected in series with it.

The elongated, relatively-massive, heat-resistant, electrically-insulating, heat-conducting blocks provided by the present invention enable the "weak spots" of the fusible elements of electric fuses to be made narrower than usual, and thus able to open circuits with the evolution of smaller quantities of vapors and with the development of lesser pressures than usual. Further, those blocks will keep the narrower than usual "weak spots" of the fusible elements of electric fuses made in accordance with the principles and teachings of the present invention from "blowing" needlessly on harmless current surges, on overloads which are transistory in character, and on overloads which are not unduly high and which are not prolonged unduly. As a result, the elongated, relatively-massive, heat-resistant, electrically-insulating, heat-conducting blocks provided by the present invention enable the electric fuses in which they are used to avoid needless "blowing" while providing prompt and full protection of the electric circuits of which they are parts.

It will be noted that the elongated, relatively-massive, heat-resistant, electrically-insulating, heat - conducting blocks provided by the present invention are set in intimate engagement with the surfaces of the fusible element adjacent which they are located, and do not have fusible elements passing through openings in them. To form openings in those elongated, relatively-massive, heat resistant, electrically-insulating, heat-conducting blocks and then pass fusible elements through those openings would result in substantial losses in heat-transferring capability, and thus would result in lower current-carrying capacity. Specifically, any opening through an elongated, relatively-massive, heat-resistant, electrically-insulating, heat-conducting block, which was intended to accommodate a fusible element, would have to be large enough to permit that fusible element to pass freely through that opening—because that fusible element will necessarily be quite thin and fragile. The resulting air gaps between the surfaces of that fusible element and the walls of that opening will reduce the amount of heat absorbed by that block—thereby reducing the current-carrying capacity of the electric fuse, and markedly reducing the ability of that electric fuse to withstand current surges.

The elongated, relatively-massive, heat-resistant, eletrically-insulating, heat-conducting blocks provided by the present invention must be very much thicker than the fusible elements which they engage. Specifically, each such block must be at least five times as thick as the fusible element which it engages. Furthermore, each elongated, relatively-massive, heat-resistant, electrically-insulating, heat-conducting block should be at least twice as long as it is wide.

In the electric fuse shown in FIGS. 1–4, the blocks 36 and 38 have the confronting faces thereof in intimate engagement with the fusible element 44, but have the outer faces thereof exposed to the arc-extinguishing material 50. If desired, further fusible elements could be disposed in intimate engagement with the outer faces of the blocks 36 and 38, and the outer faces of those further fusible elements could have additional elongated, relatively-massive, heat-resistant, electrically-insulating, heat-conducting blocks set in intimate engagement with them. In such event, the blocks 36 and 38 would help absorb heat from the fusible elements in intimate engagement with the outer faces thereof as well as from the fusible element 44.

In the electric fuses shown in the drawing, all of the elongated, relatively-massive, heat-resistant, electrically-insulating, heat-conducting blocks are provided with metallized ends, and those metallized ends are soldered to the confronting faces of the end bells of those electric fuses. However, if a slightly less-effective heat transfer between the end bells and the elongated, relatively-massive, heat-resistant, electrically-insulating, heat-conducting blocks was acceptable, the end bells of an electric fuse could be pressed against the metallized ends of the blocks with sufficient force to provide such a heat transfer. If desired, the elongated, relatively-massive, heat-resistant, electrically-insulating, heat conducting blocks of an electric fuse could be arranged so some of them were soldered to one, but not to the other, of the end bells of that electric fuse; while other of those blocks were soldered to the other, but not soldered to the one, end bell. Where the unsoldered ends of the elongated, relatively-massive, heat-resistant, electrically-insulating, heat-conducting blocks were pressed tightly against the end bells to which they were not soldered, the total heat transference between those blocks and the end bells of the electric fuse would be greater than the heat transference where neither ends of the those blocks were soldered to the end bells; but would be less than the heat transference where both ends of those blocks were soldered to those end bells. Further, if desired, each of the elongated, relatively-massive, heat resistant, electrically-insulating, heat-conducting blocks could be made in two parts, and the parts of each block could engage the end bells and leave a small gap between the confronting ends thereof. While electric fuses made with two-part blocks would not be able to provide the heat-conducting action that is so useful where those electric fuses are used to protect diodes and other solid state devices, those electric fuses would have greater current-carrying capacity than would electric fuses which were identical to them but which did not have any such blocks. If lesser increases in current-carrying capacity were acceptable, it would be possible to make the elongated, relatively-massive, heat-resistant, electrically-insulating, heat-conducting blocks so the ends thereof were close to, but spaced out of engagement with, the end bells of the electric fuse. Further, if desired, the ends of the elongated, relatively-massive, heat-resistant, electrically-insulating, heat-conducting blocks could be left barren of metallizing and could be attached to the confronting faces of the end bells by solder.

The elongated, relatively-massive, heat-resistant, electrically-insulating, heat-conducting blocks shown in the drawing are homogeneous in nature. However, as explained hereinbefore, those blocks could be made with metal cores or could have metal blocks set in engagement with the outer faces thereof. Also, if desired, one or more of those blocks could be made in the form of a tubular block of insulating material which had one end thereof closed and which had a core of metal extending into the other end thereof. While the elongated, relatively-massive, heat-resistant, electrically-insulating, heat-conducting blocks could be made in many different ways and could have many different configurations, lengths and cross sections, including polygonal and arcuate and mixed polygonal and arcuate cross sections, those blocks should be in intimate engagement with major portions of the lengths of surfaces of the fusible elements and should directly engage the "weak spots" of those fusible elements. The elongated, relatively-massive, heat-resistant, electrically-insulating, heat-conducting blocks 36 and 38 of FIGS. 2–4 are shown as wide as the fusible element 44; but those elongated, relatively-massive, heat-resistant, electrically-insulating, heat-conducting blocks will usually be made wider than that fusible element. The wider elongated, relatively-massive, heat-resistant, electrically-insulating, heat-conducting blocks are desirable, because they will engage all portions of the wide surfaces of the fusible element 44 even if the long axes of those elongated, relatively-massive, heat-resistant, electrically-insulating, heat-conducting blocks are not precisely aligned with the long axis of that fusible element.

As the fusible elements within the various electric fuses shown in the drawing respond to increases in the currents flowing through them to become heated, those fusible elements will tend to elongate in accordance with the thermal coefficients of expansion of the materials of those fusible elements. However, because the end bells of those electric fuses are held in rigidly spaced relation, those fusible elements will not be able to elongate in the axial direction; and hence those fusible elements will tend to elongate by bowing laterally. Any such lateral bowing will be prevented by the elongated, relatively-massive, heat-resistant, electrically-insulating, heat-conducting blocks which intimately engage those fusible elements; but the forces within those fusible elements which urge those fusible elements to bow will be useful, because they will further increase the intimacy of engagement between those fusible elements and the elongated, relatively-massive, heat-resistant, electrically-insulating, heat-conducting blocks in engagement with them. Because the "weak spots" of those fusible elements are mechanically weaker, as well as electrically weaker, than the remaining portions of those fusible elements, it will be the "weak spots" of those fusible elements which are urged into even more intimate engagement with those elongated, relatively-massive, heat-resistant, electrically-insulating, heat-conducting blocks; and this is desirable, because it will further increase the absorption of heat from those "weak spots."

The arc-extinguishing material, within the casings of electric fuses that are made in accordance with the principles and teachings of the present invention, will be immediately adjacent the spaces between the confronting edges of the elongated, relatively-massive, heat-resistant, electrically-insulating, heat-conducting blocks; and hence that arc-extinguishing material will receive the metal vapors, the gases, and any flames that are developed as the fusible elements "blow." Where the arc-extinguishing material is quartz sand, the metal vapors, the gases, and any flames that are developed as the fusible elements "blow" will form fulgurites in that arc-extinguishing material adjacent the spaces between the confronting edges of the elongated, relatively-massive, heat-resistant, electrically-insulating, heat-conducting blocks. Because the arc-extinguishing material is closely adjacent to the fusible elements of the electric fuses provided by the present invention, that arc-extinguishing material will be able to help extinguish any arcs that tend to form as the fusible elements fuse.

The fusible elements of electric fuses that are made in accordance with the principles and teachings of the present invention will have smaller cross sections than will the fusible elements of electric fuses which have the same ratings but which are not equipped with elongated, relatively-massive, heat-resistant, electrically-insulating, heat-conducting blocks; and hence the electric fuses that are made in accordance with the principles and teachings of the present invention will have lower instantaneous peak let-through currents than will the electric fuses which have the same ratings but which are not equipped with elongated, relatively-massive, heat-resistant, electrically-insulating, heat-conducting blocks. Further, the normal maximum temperatures of the casings of electric fuses that are made in accordance with the principles and teachings of the present invention will be lower than the normal maximum temperatures of the casings of electric fuses which have the same ratings but which are not equipped with elongated, relatively-massive, heat-resistant, electrically-insulating, heat-conducting blocks; because the elongated, relatively-massive, heat-resistant, electrically-insulating, heat-conducting blocks distribute the heat, generated by the fusible elements, along the lengths of those fusible elements and thus keep excessively-high temperatures from developing at any points on the casings of the electric fuses.

The elongated, relatively-massive, heat-resistant, electrically-insulating, heat-conducting blocks provided by the present invention will be substantially unchanged by any heat and flames which develop as the fusible elements "blow"—even though those fusible elements interrupt electric circuits to which two hundred or more volts are applied—and that is very important. If those elongated, relatively-massive, heat-resistant, electrically-insulating, heat-conducting blocks were to evolve vapors and gases or were to char or burn, as would blocks made from fibre, glass melamine or other organic materials, those blocks or the vapors or gases evolved thereby would tend to "feed" any electrical arcs which developed as the fusible elements "blew;" and any "feeding" of such electrical arcs would be extremely objectionable. By remaining substantially unchanged by any heat and flames which develop as the fusible elements "blow," the elongated, relatively-massive, heat-resistant, electrically-insulating, heat-conducting blocks provided by the present invention help limit the severity of any electrical arcs which develop as the fusible elements "blow."

The elongated, relatively-massive, heat-resistant, electrically-insulating, heat-conducting blocks provided by the present invention absorb heat from the portions of the fusible elements that are being heated and fused by the electrical arcs; and hence those elongated, relatively-massive, heat-resistant, electrically-insulating, heat-conducting blocks retard the rates at which those portions of the fusible elements fuse. This is very desirable, because it reduces the rates of change of the currents flowing through those fusible elements, and thus reduces the voltage surges to which the electric circuits will be subjected as those fusible elements fuse. For example, when six hundred volt fuses were "blown" with one hundred thousand amperes short-circuit current available, the following voltage surges were measured:

| Fuse rating in amperes | Fuse equipped with blocks | Fuse not equipped with blocks |
| --- | --- | --- |
| 200 | 940 volts | 1,270 to 1,330 volts. |
| 400 | 1,070 volts | 1,310 to 1,380 volts. |
| 600 | 1,060 volts | 1,350 to 1,520 volts. |

The much lower voltage surges, which develop in circuits protected by the electric fuses of the present invention, make those electric fuses of great value in protecting diodes and other solid state devices which can be injured by unduly large voltage surges.

Whereas the drawing and accompanying description have shown and described several preferred embodiments of the present invention, it should be apparent to those skilled in the art that various changes may be made in the form of the invention without affecting the scope thereof.

What I claim is:
1. An electric fuse which comprises:
   a housing,
   terminals that are secured to said housing and that are spaced apart to define an area which is within said housing and between said terminals,
   a fusible element disposed within said area and electrically connected to said terminals so current can flow from one of said terminals through said fusible element and into the other of said terminals as long as the value of said current does not exceed the rated current of said electric fuse,
   a heat-resistant element of high thermal conductivity disposed within said area and in heat-transferring engagement with the major portion of the length of one surface of said fusible element,
   a second heat-resistant element of high thermal conductivity disposed within said area and in heat-transferring engagement with the major portion of the length of a second surface of said fusible element,
   the first said heat-resistant element of high thermal conductivity holding said major portion of the length of said second surface of said fusible element in engagement with said second heat-resistant element of high thermal conducitvity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements.

2. An electric fuse as claimed in claim 1 wherein at least one of said heat-resistant elements spans the distance between said terminals.

3. An electric fuse as claimed in claim 1 wherein at least one of said heat-resistant elements is physically connected to one of said terminals.

4. An electric fuse as claimed in claim 1 wherein said fusible element has at least one reduced-width portion intermediate the length thereof to serve as a "weak spot," said reduced-width portion being narrower than either of said heat-resistant elements.

5. An electric fuse as claimed in claim 1 wherein said fusible element has at least one reduced-width portion intermediate the length thereof to serve as a "weak spot," wherein said heat-resistant elements keep said fusible element from bowing as it becomes heated, and wherein the forces which tend to cause said fusible element to bow as it becomes heated will force said reduced-width portion of said fusible element into even more effective heat-transferring engagement with said heat-resistant elements.

6. An electric fuse as claimed in claim 1 wherein one end of the first said heat-resistant element abuts one of said terminals.

7. An electric fuse as claimed in claim 1 wherein both ends of the first said heat-resistant element abut said terminals.

8. An electric fuse as claimed in claim 1 wherein one end of the first said heat-resistant element abuts a terminal, and wherein one end of said second heat-resistant element abuts a terminal.

9. An electric fuse as claimed in claim 1 wherein said fusible element is polygonal in cross section and wherein said one and said second surfaces of said fusible element are the oppositely-disposed wide surfaces of said fusible element.

10. An electric fuse as claimed in claim 1 wherein said heat-resistant elements are disposed oppositely of said fusible element and are in register with each other.

11. An electric fuse as claimed in claim 1 wherein both ends of the first said heat-resistant element abut said terminals, and wherein heat-conducting material bonds said ends of the first said heat-resistant element to said terminals.

12. An electric fuse as claimed in claim 1 wherein said heat-resistant elements are made of inorganic material which experiences no thermal degradation at temperatures which can develop within said fusible element.

13. An electric fuse as claimed in claim 1 wherein said heat-resistant elements can conduct heat from one of said terminals to the other of said terminals whenever a heated device is close to said one terminal, thereby facilitating the dissipation of heat from said heated device.

14. An electric fuse which comprises:
a housing,
terminals that are secured to said housing and that are spaced apart to define an area which is within said housing and between said terminals,
a fusible element disposed within said area and electrically connected to said terminals so current can flow from one of said terminals through said fusible element and into the other of said terminals as long as the value of said current does not exceed the rated current of said electric fuse,
a heat-resistant element of high thermal conductivity disposed within said area and in heat-transferring engagement with the major portion of the length of one surface of said fusible element,
a second heat-resistant element of high thermal conductivity disposed within said area and in heat-transferring engagement with the major portion of the length of a second surface of said fusible element,
the first said heat-resistant element of high thermal conductivity holding said major portion of the length of said second surface of said fusible element in engagement with said second heat-resistant element of high thermal conductivity throughout the operation of said electric fuse,
said second heat-resistant element of high thermal conductivity holding said major portion of the length of said one surface of said fusible element in engagement with said first said heat-resistant element of high thermal conductivity throughout the operation of said electric fuse,
said first said and said second heat-resistant elements of high thermal conductivity being free from charring or burning at the temperature at which said fusible element fuses,
said first said and said second heat-resistant elements of high thermal conductivity having thermal conductivities greater than thirty thousandths of a calorie per square centimeter of cross section per centimeter of length per second of time per degree centigrade,
said heat-resistant elements being massive relative to said fusible element,
said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of sad fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, at least one of said heat-resistant elements being more than five times as thick as said fusible element, at least one of said heat-resistant elements having a width that is at least substantially as large as the width of said fusible element, at least one of said heat-resistant elements consisting of a refractory material.

15. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high terminal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, the first said heat-resistant element of high thermal conductivity holding said major portion of the length of said second surface of said fusible element in engagement with said second heat-resistant element of high thermal conductivity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first said and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, at least one of said heat-resistant elements being physically connected to, and transferring heat to, both of said terminals.

16. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, the first said heat-resistant element of high thermal conductivity holding said major portion of the length of said second surface of said fusible element in engagement with said second heat-resistant element of high thermal conductivity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first said and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, said fusible element having at least one reduced-width portion intermediate the length thereof to serve as a "weak spot,"

both of said heat-resistant elements directly engaging said one reduced-width portion of said fusible element throughout the operation of said electric fuse.

17. An electric fuse which comprises:

a housing, terminals that are secured to said housing and that are spaced apart to defined an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, said heat-resistant elements being massive relative to said fusible element, said heat-resistant elements being electrically-insulating so they can engage said major portions of the lengths of said surface of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, said heat-resistant elements being selected from the group consisting of aluminum oxide, beryllium oxide, boron nitride.

18. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, the first said heat-resistant element of high thermal conductivity holding said major portion of the length of said second surface of said fusible element in engagement with said second heat-resistant element of high thermal conductivity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first said and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, said heat-resistant elements keeping said fusible element from bowing as it becomes heated, and the forces which tend to cause said fusible element to bow as it becomes heated forcing parts of said fusible element into even more effective heat-transferring engagement with said heat-resistant elements.

19. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, the first said heat-resistant element of high thermal conductivity holding said major portion of the length of said second surface of said fusible element in engagement with said second heat-resistant element of high thermal conductivity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first said and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, both ends of the first said heat-resistant element abutting said terminals, and thereby transferring heat to both of said terminals, and both ends of said second heat-resistant element abutting said terminals, and thereby transferring heat to both of said terminals.

20. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with the major portion of the length of one surface of said fusible element, a second heat-resistant element of high thermal conductivity disposed within said area and in heat-transferring engagement with the major portion of the length of a second surface of said fusible element, the first said heat-resistant element of high thermal conductivity holding said major portion of the length of said second surface of said fusible element in engagement with said second heat-resistant element of high thermal conductivity throughout the operation of said electric fuse, said second heat-resistant element of high thermal conductivity holding said major portion of the length of said one surface of said fusible element in engagement with said first said heat-resistant element of high thermal conductivity throughout the operation of said electric fuse, said first said and said second heat-resistant elements of high thermal conductivity being free from charring or burning at the temperature at which said fusible element fuses, said first said and said second heat-resistant elements of high thermal conductivity having thermal conductivities greater than thirty thousandths of a calorie per square centimeter of cross section per centimeter of length per second of time per degree centigrade, said heat-resistant elements being massive relative to said fusible element, said heat-resistant elements being electrically-insulating so they can engage said major portions of the lengths of said surfaces of said fusible element without "shorting" said major portions of the lengths of said surfaces of said fusible element, arc-extinguishing material disposed within said area and surrounding said fusible element and said heat-resistant elements, said heat-resistant elements being elongated and having the long axes thereof parallel to the long axis of said fusible element, the first said heat-resistant element absorbing heat from said major portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said major portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements, both ends of the first said heat-resistant element abutting said terminals, and thereby transferring heat to both of said terminals, and electrically-conductive material bonding said ends of the first said heat-resistant element and of said fusible element to said terminals, thereby enhancing the transfer of heat from said first said heat-resistant element to said terminals.

21. An electric fuse which comprises:

a housing, terminals that are secured to said housing and that are spaced apart to define an area which is within said housing and between said terminals, a fusible element disposed within said area and electrically connected to said terminals so current can flow from one of said terminals through said fusible element and into the other of said terminals as long as the value of said current does not exceed the rated current of said electric fuse, a heat-resistant element of high thermal conductivity disposed within said area and in heat-transferring engagement with portion of the length of one surface of said fusible element, a second heat-resistant element of high thermal conductivity disposed within said area and in heat-transferring engagement with a portion of the length of a second surface of said fusible element, the first said heat-resistant element of high thermal conductivity holding said portion of the length of said second surface of said fusible element in engagement with said second said heat-resistant element of high thermal conductivity throughout the operation of said electric fuse, said second heat-resistant element of high thermal conductivity holding said portion of the length of said one surface of said fusible element in engagement with said first said heat-resistant element of high thermal conductivity throughout the operation of said electric fuse, said first said and said second heat-resistant elements of high thermal conductivity having thermal conductivities greater than thirty thousandths of a calorie per square centimeter of cross section per centimeter of length per second of time per degree centigrade, said heat-resistant elements being made from inorganic material so they will not char or burn as said fusible element becomes heated by current flowing through it, each of said heat-resistant elements having a thickness greater than five times the thickness of said fusible element so said heat-resistant elements are massive relative to said fusible element, said heat-resistant elements being electrically-insulating so they can engage said portions of the lengths of said surfaces of said fusible element without "shorting" said portions of the lengths of said surfaces of said fusible element, arc-extinguishing material disposed within said area and surrounding said fusible element and said heat-resistant elements, the first said heat-resistant element absorbing heat from said portion of the length of the first said surface of said fusible element and transferring part of that heat to said arc-extinguishing material, transferring another part of that heat to cooler portions of said fusible element, and conducting a further part of that heat toward said terminals, said second heat-resistant element absorbing heat from said portion of the length of said second surface of said fusible element and transferring part of that heat to said arc-extinguishing material, transferring another part of that heat to cooler portions of said fusible element, and conducting a further part of that heat toward said terminals, said electric fuse having a current-carrying capacity which is substantially greater than, and having a current-limiting capability which is substantially as high as, the current-carrying capacity and the current-limiting capability of an electric fuse which has an identical housing, identical terminals, an identical fusible element, and identical arc-extinguishing material but which does not have said heat-resistant elements.

22. An electric fuse as claimed in claim 21 wherein said fusible element has at least one reduced-width portion intermediate the length thereof to serve as a "weak spot," said reduced-width portion being narrower than either of said heat-resistant elements.

23. An electric fuse as claimed in claim 21 wherein said fusible element has at least one reduced-width portion intermediate the length thereof to serve as a "weak spot," both of said heat-resistant elements directly engaging said one reduced-width portion of said fusible element.

24. An electric fuse as claimed in claim 21 wherein said heat-resistant elements are selected from the group consisting of aluminum oxide, beryllium oxide, boron nitride.

25. An electric fuse as claimed in claim 21 wherein said heat-resistant elements keep said fusible element from bowing as it becomes heated, and wherein the forces which tend to cause said fusible element to bow as it becomes heated will force parts of said fusible element into even more effective heat-transferring engagement with said heat-resistant elements.

26. An electric fuse as claimed in claim 21 wherein said fusible element has at least one reduced-width portion intermediate the length thereof to serve as a "weak spot," wherein said heat-resistant elements keep said fusible element from bowing as it becomes heated, and wherein the forces which tend to cause said fusible element to bow as it becomes heated will force said reduced-width portion of said fusible element into even more effective heat-transferring engagement with said heat-resistant elements.

27. An electric fuse as claimed in claim 21 wherein said fusible element is polygonal in cross section and wherein said one and said second surfaces of said fusible element are the oppositely-disposed wide surfaces of said fusible element.

References Cited
UNITED STATES PATENTS

| | | | |
|---|---|---|---|
| 2,665,348 | 1/1954 | Kozocka | 337—159 |
| 2,326,257 | 8/1943 | Schmidt et al. | 337—166 |
| 2,055,115 | 9/1936 | Wood | 337—166 |

BERNARD A. GILHEANY, Primary Examiner

D. M. MORGAN, Assistant Examiner

U.S. Cl. X.R.

337—161, 185